United States Patent
Chang

(10) Patent No.: US 9,766,759 B2
(45) Date of Patent: Sep. 19, 2017

(54) MUTUAL CAPACITANCE TOUCH SENSING DEVICE AND ITS SINE WAVE MEASURING METHOD

(71) Applicant: eGalax_eMPIA Technology Inc., Taipei (TW)

(72) Inventor: Chin-Fu Chang, Taipei (TW)

(73) Assignee: EGALAX_EMPIA TECHNOLOGY INC., Taipei (TW)

(*) Notice: Subject to any disclaimer, the term of this patent is extended or adjusted under 35 U.S.C. 154(b) by 61 days.

(21) Appl. No.: 14/581,117

(22) Filed: Dec. 23, 2014

(65) Prior Publication Data

US 2015/0185922 A1 Jul. 2, 2015

(30) Foreign Application Priority Data

Dec. 31, 2013 (TW) .............................. 102149334 A

(51) Int. Cl.
  G06F 3/041 (2006.01)
  G06F 3/044 (2006.01)
  G06F 3/043 (2006.01)
  F02D 35/02 (2006.01)
  H02P 6/18 (2016.01)

(52) U.S. Cl.
  CPC ............ *G06F 3/044* (2013.01); *G06F 3/0416* (2013.01)

(58) Field of Classification Search
  CPC .................................. G06F 3/044; G06F 3/041
  USPC ............................................ 363/39; 345/173
  See application file for complete search history.

(56) References Cited

U.S. PATENT DOCUMENTS

| | | | | |
|---|---|---|---|---|
| 6,310,788 B1* | 10/2001 | Myer | ...................... | H02M 5/14 323/213 |
| 2005/0146513 A1* | 7/2005 | Hill | ...................... | G06F 3/0436 345/173 |
| 2007/0247099 A1* | 10/2007 | Lu | ........................... | H02P 6/182 318/461 |
| 2008/0157867 A1* | 7/2008 | Krah | ...................... | G06F 3/044 329/304 |
| 2008/0309625 A1* | 12/2008 | Krah | ...................... | G06F 3/041 345/173 |
| 2009/0009483 A1* | 1/2009 | Hotelling | .............. | G06F 3/0416 345/173 |
| 2011/0276293 A1* | 11/2011 | Kitamura | .............. | F02D 35/027 702/76 |
| 2014/0198053 A1* | 7/2014 | Yoon | ..................... | G06F 3/0416 345/173 |

* cited by examiner

*Primary Examiner* — Lin Li
(74) *Attorney, Agent, or Firm* — Muncy, Geissler, Olds & Lowe, P.C.

(57) ABSTRACT

A mutual capacitance touch sensing device and a sine wave measuring method is disclosed. A sine wave generator of a driver and sensor module of a touch sensing panel of the mutual capacitance touch sensing device uses a clock to generate multiple sine waves according to a lookup table being loaded therein, enabling a selective circuit to transmit the sine waves to driving lines of the touch sensing panel in a proper order so that each sine wave at each driving line is capacitive-coupled to a respective sensing line through a respective crossover point to produce a respective sensing signal, and then a measurement unit scans the generated sensing signal subject to the lookup table in the sine wave generator and then provides the measured signals to a processor for processing.

10 Claims, 7 Drawing Sheets

| Phase | Two times the sine value |
|---|---|
| 15° | 0.5176380902 |
| 30° | 1 |
| 60° | 1.73205080757 |
| 90° | 2 |
| ... | ... |

FIG. 4

MUTUAL CAPACITANCE TOUCH SENSING DEVICE AND ITS SINE WAVE MEASURING METHOD

This application claims the priority benefit of Taiwan patent application number 102149334, filed on Dec. 31, 2013.

BACKGROUND OF THE INVENTION

1. Field of the Invention

The present invention relates to touch sensing technology and more particularly, to a mutual capacitance touch sensing device and a sine wave measuring method used in the mutual capacitance touch sensing device, wherein the sine wave generator uses a clock to generate sine waves according to a lookup table being loaded therein, and the measurement unit scans sensing signals subject to the lookup table in the sine wave generator, and therefore, the invention can generate sine waves and detect sensing signals by means of the lookup table, simplifying the loop operation of the mutual capacitance touch sensing device and increasing its operational efficiency.

2. Description of the Related Art

In order to fit with human intuition, touch sensing devices are widely used in modern electronic products, enabling the user to control electronic products conveniently by means of a touch of a finger or stylus.

A touch sensing device generally comprises a touch sensing panel having arranged therein a plurality of driving lines and sensing lines to form a plurality of crossover points, a driver module electrically coupled with the driving lines, a sensor module electrically coupled with the sensing lines, and a processor electrically coupled with the sensor module. The driver module is controlled to provide a driving signal to the driving lines. At this time, the driving signal at each driving line is coupled to the respective sensing line through the respective crossover point. Thus, the sensor module scans the sensing signal at each crossover point, and transmits each measured signal to the processor for analysis. Subject to the capacitive coupling amount at each crossover point and the relative location data, a respective reference value is obtained. When a user operates the touch sensing device, the measured signal corresponding to each crossover point is compared with the respective reference value. If the difference between the measured signal and the respective reference value is zero, it means the touch sensing panel is not touched or covered by an external object. On the contrary, if there is a difference between the measured signal and the respective reference value, it means the touch sensing panel is touched or covered by an external object.

In the application of the aforesaid prior art touch sensing device, every operation, either transmitting a driving signal, measuring a sensing signal or determining a touch state, must be achieved through different component parts of the touch sensing device. Thus, this prior art design of touch sensing device complicates the loop operation, lowering the operational efficiency.

SUMMARY OF THE INVENTION

The present invention has been accomplished under the circumstances in view. It is therefore the main object of the present invention to provide a mutual capacitance touch sensing device and its sine wave measuring method, which simplifies the loop operation of the mutual capacitance touch sensing device and increases its operational efficiency.

To achieve this and other objects of the present invention, a mutual capacitance touch sensing device in accordance with the present invention comprises a touch sensing panel having arranged therein a plurality of driving lines extending along a first axis in a parallel manner and a plurality of sensing lines extending along a second axis in a parallel manner and crossed over the driving lines to form a plurality of crossover points, a driver and sensor module comprising a selective circuit electrically connected with the driving lines, a sine wave generator electrically connected with the selective circuit and adapted for generating sine waves according to a lookup table being built therein and a measurement unit electrically connected with the sine wave generator and adapted for scanning each sensing signal generated at each sensing line subject to the lookup table in the sine wave generator, and a processor electrically connected with the measurement unit for receiving measured signals. Therefore, the invention can generate sine waves and detect sensing signals by means of the lookup table, simplifying the loop operation of the mutual capacitance touch sensing device and increasing its operational efficiency.

Further, the integer multiple of the sine value of each phase is a predetermined voltage value of the respective phase. Further, the integer multiple of the sine value of each measuring phase is an integer value. When the measurement unit scans and obtains the generated sensing signal at the crossover point at each sensing line subject to the lookup table, it can provide integer values of the multiple measuring phases of each sine wave to the processor for integer arithmetic, thus, when comparing this technique of integer arithmetic with the conventional technique of floating point arithmetic, the invention simplifies the sensing signal sensing process and, the processor used in the mutual capacitance touch sensing device in accordance with the present invention can be selected from a relatively lower level, saving the cost.

BRIEF DESCRIPTION OF THE DRAWINGS

FIG. 4 illustrates a phase-vs-two times the sine value table in accordance with the present invention.

DETAILED DESCRIPTION OF THE PREFERRED EMBODIMENT

Figure 1:
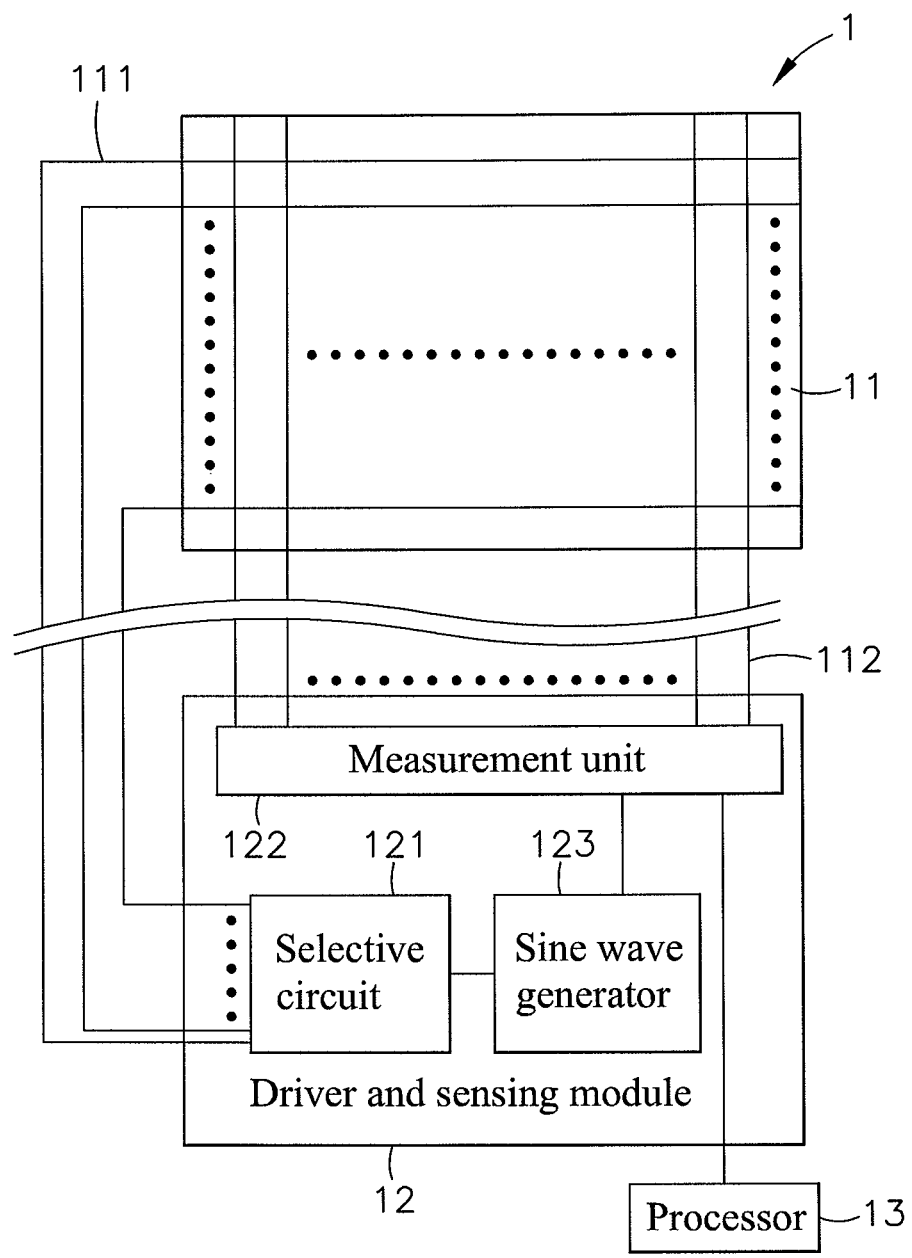
FIG. 1 is a schematic circuit block diagram of a mutual capacitance touch sensing device in accordance with the present invention.

Referring to FIG. 1, a mutual capacitance touch sensing device 1 in accordance with a first embodiment of the present invention is shown. The mutual capacitance touch sensing device 1 comprises a touch sensing panel 11 having arranged therein a plurality of driving lines 111 extending along a first axis in a parallel manner and a plurality of sensing lines 112 extending along a second axis in a parallel manner and crossed over the driving lines 111 to form a plurality of crossover points, a driver and sensor module 12 that comprises a selective circuit 121 electrically connected with the driving lines 111, a measurement unit 122 electrically connected with the sensing lines 112 and a sine wave generator 123 electrically connected with the selective circuit 121 and the measurement unit 122, and a processor 13 electrically connected with the measurement unit 122.

The selective circuit 121 can be formed of one or multiple MUXs (Multi-plexer), changeovers or switches. In the present preferred embodiment, the processor 13 is disposed outside the driver and sensor module 12. Alternatively, the driver and sensor module 12 and the processor 13 can be integrated into a monolithic IC chip.

The sine wave generator 123 of the driver and sensor module 12 of the mutual capacitance touch sensing device 1 has built therein a lookup table that was established using a sine wave differential technique to differentiate sine wave into a plurality of segments each corresponding to one respective phase where the integer multiple of the sine value of each phase is a predetermined voltage value of the respective phase, and multiple particular phases are marked as predetermined measuring phases (such as 30°, 90°, 150°, 210°, 270° and 330°, etc.).

The touch sensing panel 11 of the mutual capacitance touch sensing device 1 can be composed of one or multiple sensing layers. If the touch sensing panel 11 is of a single layer design, the driving lines 111 and the sensing lines 112 are arranged in the same sensing layer. If the touch sensing panel 11 is of a multi-layer design, the driving lines 111 and the sensing lines 112 are arranged in different sensing layers.

The driving lines 111 and sensing lines 112 of the touch sensing panel 11 of the mutual capacitance touch sensing device 1 are respectively arranged in a parallel manner and respectively extend along the first axis and the second axis. Further, each driving line 111 and the respective sensing line 112 are crossing over each other in an orthogonal crossover configuration or non-orthogonal crossover configuration.

Figure 2:
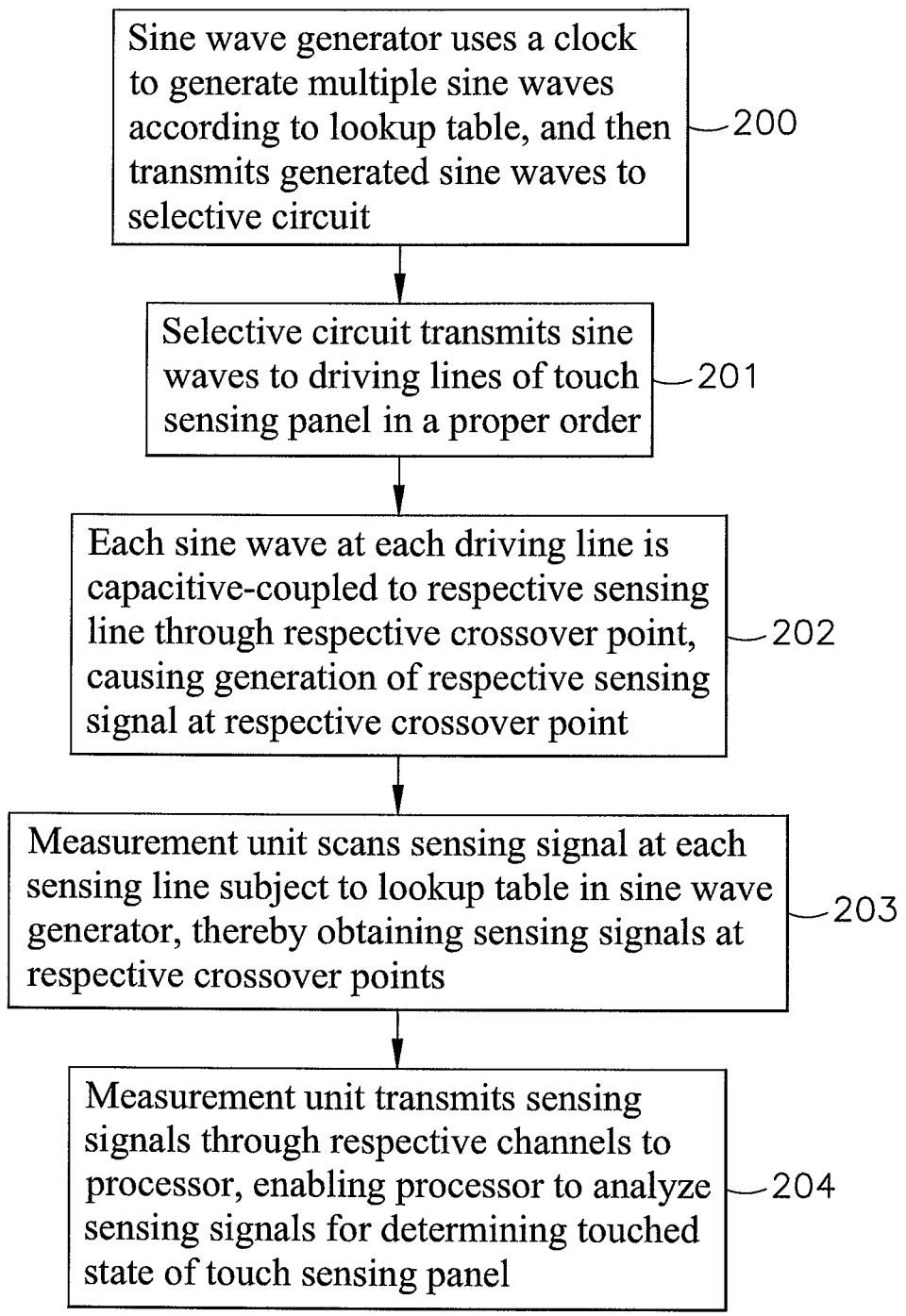
FIG. 2 is a flow chart of a sine wave measuring method in accordance with the present invention.
Figure 3:
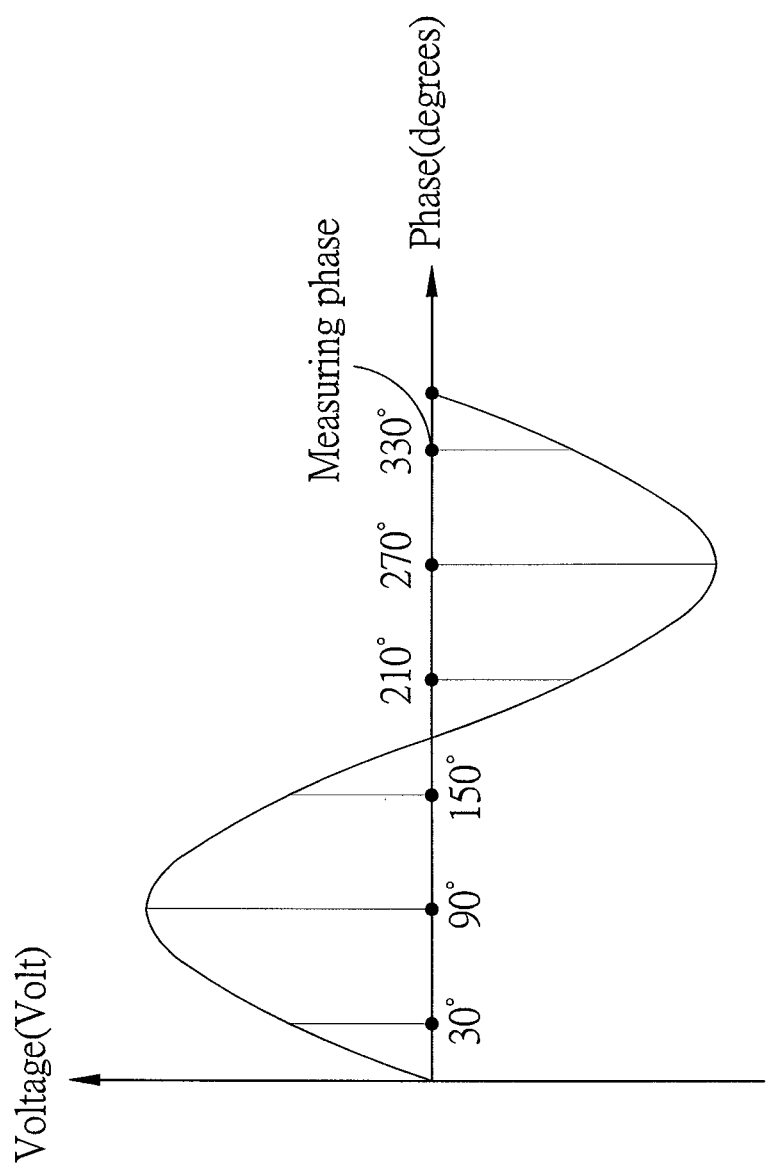
FIG. 3 illustrates a lookup table in accordance with the present invention.

Referring to FIGS. 2 and 3 and FIG. 1 again, the invention also provides a touch sensing device reference value two dimensional measuring method for use in the aforesaid mutual capacitance touch sensing device 1. The method comprises the steps of:

(200) Sine wave generator 123 uses a clock to generate multiple sine waves according to the lookup table, and then transmits the generated sine waves to the selective circuit 121.

(201) Selective circuit 121 transmits the sine waves to the driving lines 111 of the touch sensing panel 11 in a proper order.

(202) Each sine wave at each driving line 111 is capacitive-coupled to the respective sensing line 112 through the respective crossover point, causing generation of a respective sensing signal at the respective crossover point.

(203) The measurement unit 122 scans the generated sensing signal at each sensing line 112 subject to the lookup table loaded in the sine wave generator 123, thereby obtaining the generated sensing signals at the respective crossover points.

(204) The measurement unit 122 transmits the measured sensing signals through respective channels 1221 (see also FIG. 5) thereof to the processor 13, enabling the processor 13 to analyze these sensing signals for determining the touched state of the touch sensing panel 11.

When using the touch sensing panel 1 in the aforesaid procedure, the sine wave generator 123 of the driver and sensor module 12 generates a clock with multiple clock cycles corresponding to respective phases in accordance with the lookup table that is built in the sine wave generator 123. Each phase generates a predetermined voltage value. Through the predetermined voltage values of the phases, a continuous series of sine waves is produced and transmitted by the sine wave generator 123 to the selective circuit 121, enabling the selective circuit 121 to transmit these sine waves to the respective driving lines 111 of the touch sensing panel 11 in a proper order. At this time, each sine wave at each driving line 111 is capacitive-coupled to the respective sensing line 112 through the respective crossover point, causing generation of a respective sensing signal at the respective crossover point. The sensing signal at each crossover point can be detected by directly measuring the capacitive coupling amount at the respective crossover point, or by means of measuring the current value, voltage value, charge magnitude, or other electronic property value at the respective crossover point to match with the location coordinates corresponding to the respective crossover point. At this time, the measurement unit 122 scans the generated sensing signal at each sensing line 112 subject to the lookup table in the sine wave generator 123, thereby obtaining the generated sensing signals at the respective crossover points. Thereafter, the measurement unit 122 transmits the obtained sensing signals to the processor 13, enabling the processor 13 to analyze these sensing signals for determining the touched state of the touch sensing panel 11. During the application of the present invention, sine waves are generated according to the lookup table that is loaded in the sine wave generator 123; the measurement unit 122 detects and obtains the generated sensing signals at the respective crossover points subject to the lookup table in the sine wave generator 123. Thus, the invention uses the lookup table for generating sine waves and detecting sensing signals, and thus, the invention simplifies the loop operation of the mutual capacitance touch sensing device 1 and increases its operational efficiency.

Referring to FIG. 4 and FIG. 3 where FIG. 3 illustrates the aforesaid lookup table; FIG. 4 illustrates a phase-vs-two times the sine value table. As illustrated, the touch sensing panel 1 generates predetermined voltage values by means of the sine wave generator 123 of the driver and sensor module 12 thereof subject to a clock with multiple clock cycles corresponding to respective phases in accordance with the lookup table that is loaded in the sine wave generator 123. The series of predetermined voltage values corresponding to the various phases of each clock cycle constitute a sine wave where a multiple of the sine value corresponding to each respective phase is the predetermined voltage value of the respective phase. As stated above, the integer multiple of the sine value of each measuring phase is an integer value (multiply the sine values of 30°, 90°, 150°, 210°, 270° and 330°, etc. by an even multiple will give an integer value). When the measurement unit 122 scans and obtains the generated sensing signal at the crossover point at each sensing line 112 subject to the lookup table, it can provide integer values of the multiple measuring phases of each sine wave to the processor 13 for integer arithmetic. When comparing this technique of integer arithmetic with the conventional technique of floating point arithmetic, the invention simplifies the sensing signal sensing process. Thus, the processor 13 used in the mutual capacitance touch sensing device 1 in accordance with the present invention can be selected from a relatively lower level, saving the cost.

In this embodiment, the sine values of multiple predetermined measuring phases (such as 30°, 90°, 150°, 210°, 270° and 330°, etc.) are multiplied by an even multiple to give predetermined voltage values corresponding to the respective measuring phases.

When the selective circuit 121 of the driver and sensor module 12 of the mutual capacitance touch sensing device 1 transmits multiple sine waves to the respective driving lines 111 of the touch sensing panel 11 in a proper order, the sinusoidal quantity receivable by each driving line 111 can be the same; alternatively, the sinusoidal quantity receivable by the driving lines 111 can be relatively increased to enhance signal intensity subject to the increase in distance between each driving line 111 and the measurement unit 122, compensating signal attenuation due to a relatively longer signal transmission distance.

Figure 5:
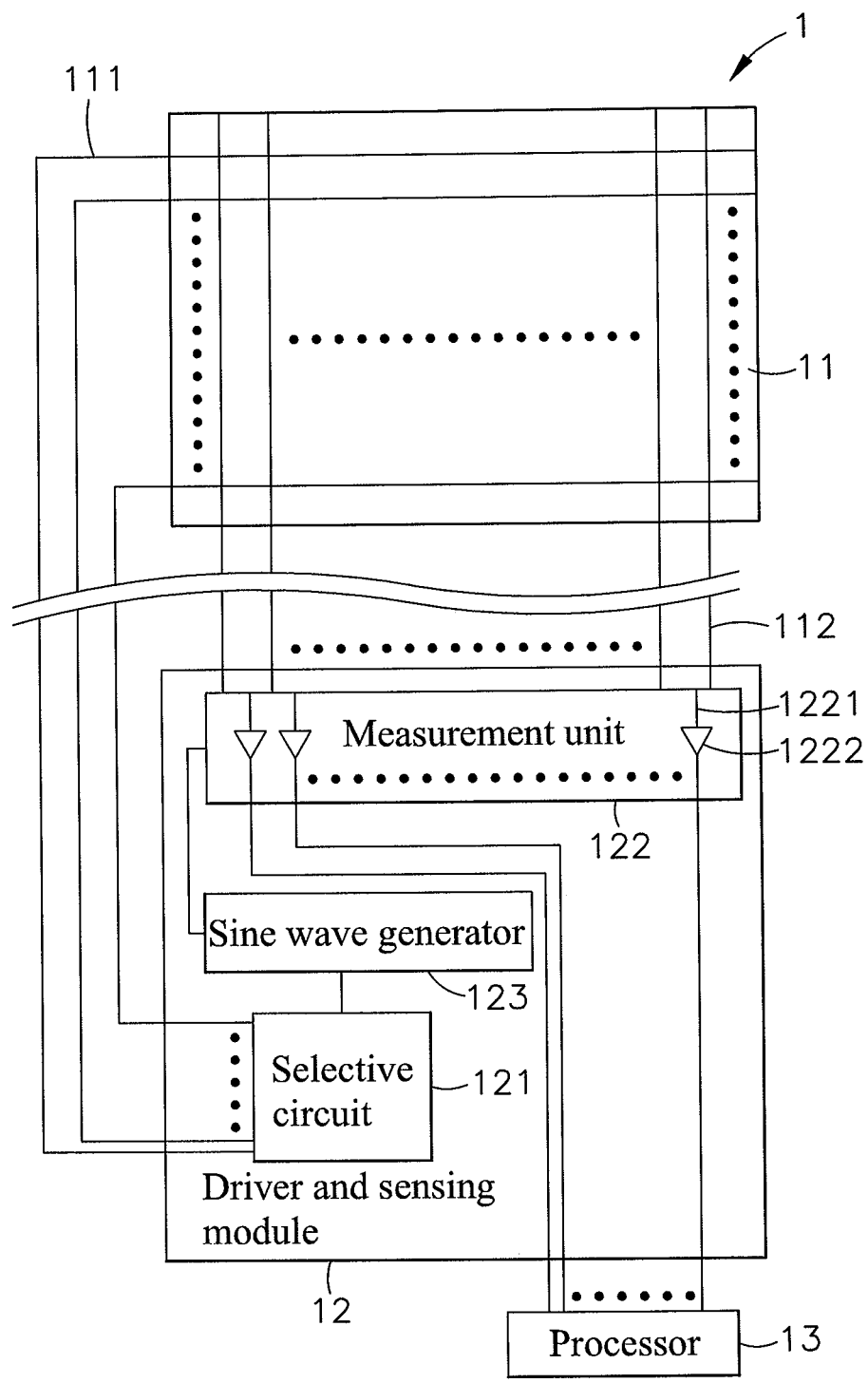
FIG. 5 is a schematic circuit block diagram of a mutual capacitance touch sensing device in accordance with a second embodiment of the present invention.

Referring to FIG. 5, a mutual capacitance touch sensing device 1 in accordance with a second embodiment of the present invention is shown. This second embodiment is substantially similar to the aforesaid first embodiment with the exception the driver and sensor module 12 of the mutual capacitance touch sensing device 1 further comprises a current-to-voltage converter 1222 electrically connected to each channel 1221 at one end and to the processor 13 at the other end for converting each sensed current signal into a voltage signal for further processing by the processor 13, preventing shunt current and assuring a high level of accuracy.

Figure 6:
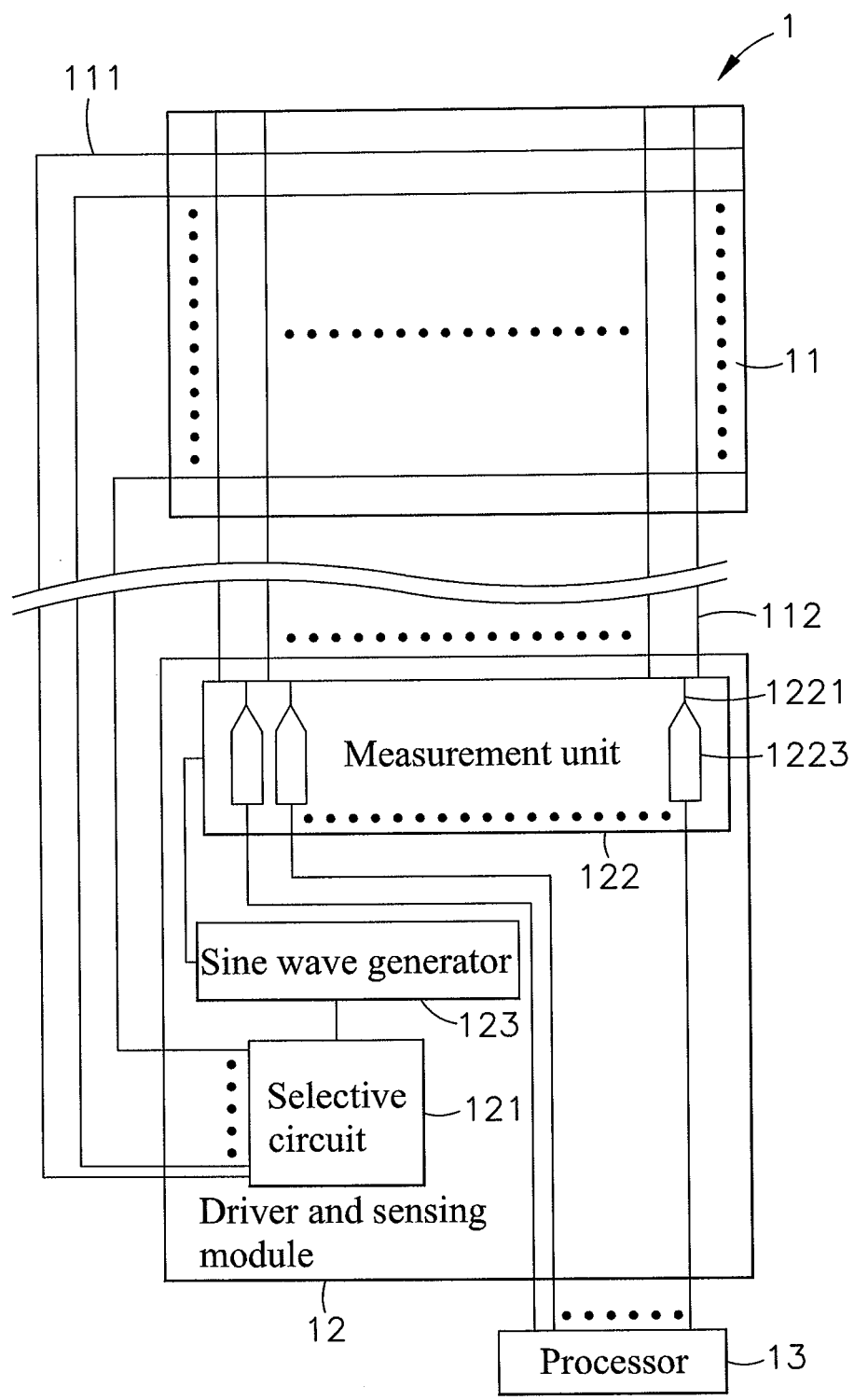
FIG. 6 is a schematic circuit block diagram of a mutual capacitance touch sensing device in accordance with a third embodiment of the present invention.

Referring to FIG. 6, a mutual capacitance touch sensing device 1 in accordance with a third embodiment of the present invention is shown. This third embodiment is substantially similar to the aforesaid first embodiment with the exception the driver and sensor module 12 of the mutual capacitance touch sensing device 1 further comprises a ADC (analog-to-digital converter) 1223 electrically connected to each channel 1221 at one end and to the processor 13 at the other end for converting each sensed analog signal into a digital signal for further processing by the processor 13. Alternatively, the ADCs (analog-to-digital converters) 1223 can be installed in the processor 13 and respectively electrically connected with the channels 1221 the driver and sensor module 12 for converting each inputted analog signal into a digital signal.

Figure 7:
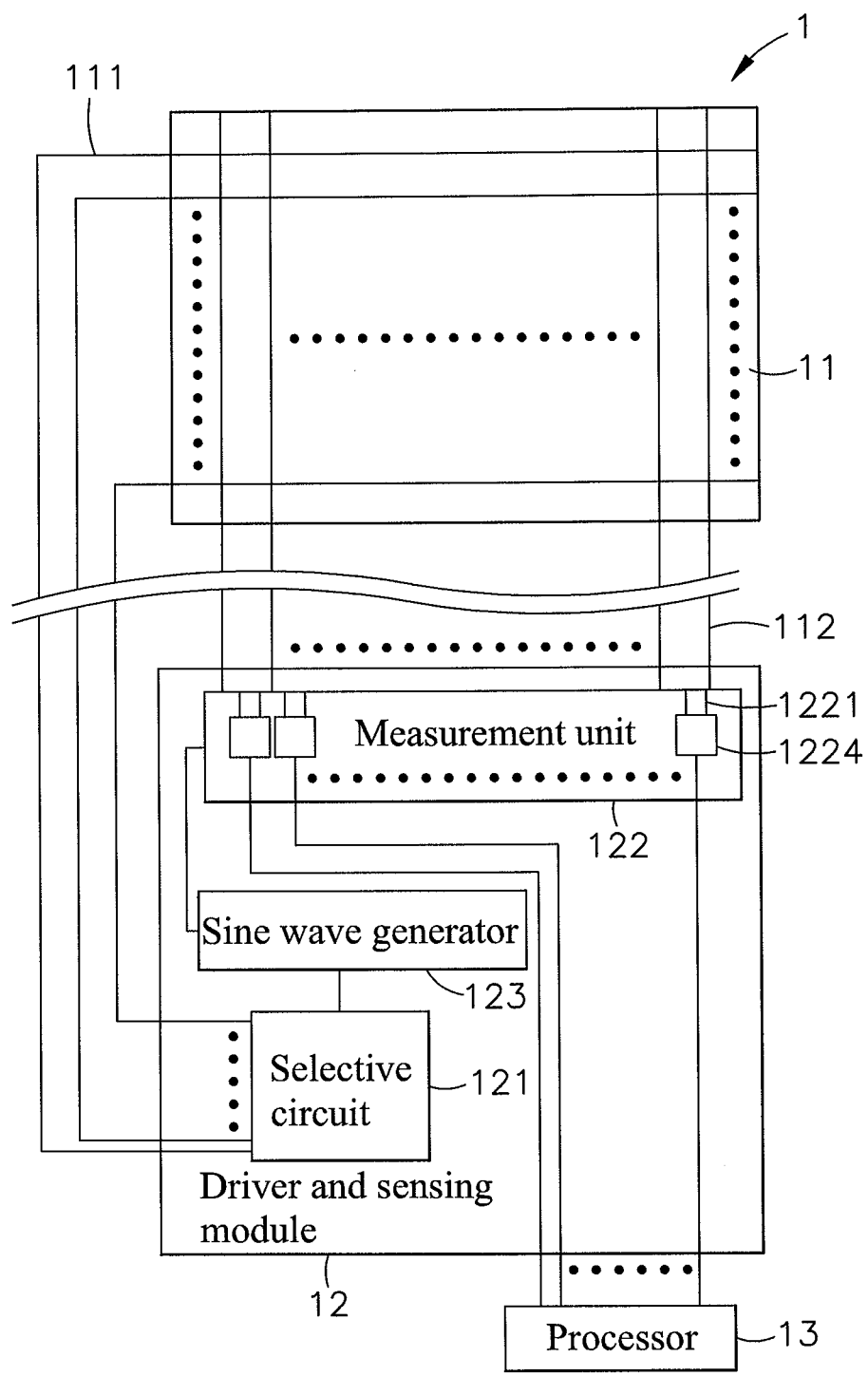
FIG. 7 is a schematic circuit block diagram of a mutual capacitance touch sensing device in accordance with a fourth the present invention.

Referring to FIG. 7, a mutual capacitance touch sensing device 1 in accordance with a fourth embodiment of the present invention is shown. This fourth embodiment is substantially similar to the aforesaid first embodiment with the exception the driver and sensor module 12 of the mutual capacitance touch sensing device 1 further comprises a subtraction circuit 1224 coupled between each two adjacent channels 1221 thereof and then electrically connected to the processor 13 for removing noises (such as parasitic capacitance, temperature, etc.) from sensed signals prior to their transmission to the processor 13 for further processing.

As stated above, the invention provides a mutual capacitance touch sensing device and its sine wave measuring method, wherein the mutual capacitance touch sensing device 1 comprises a touch sensing panel 11 having arranged therein a plurality of driving lines 111 extending along a first axis in a parallel manner and a plurality of sensing lines 112 extending along a second axis in a parallel manner and crossed over the driving lines 111 to form a plurality of crossover points, a driver and sensor module 12 comprising a selective circuit 121 electrically connected with the driving lines 111, a sine wave generator 123 electrically connected with the selective circuit 121 and adapted for generating sine waves according to a lookup table being loaded therein and a measurement unit 122 electrically connected with the sine wave generator 123 and adapted for scanning each sensing signal generated at each sensing line 112 subject to the lookup table in the sine wave generator 123, and a processor 13 electrically connected with the measurement unit 122 for receiving measured signals.

In conclusion, the invention provides a mutual capacitance touch sensing device and its sine wave measuring method, having the advantages as described hereinafter:

1. The sine wave generator 123 uses a clock to generate sine waves according to a lookup table being loaded therein; the measurement unit 122 scans sensing signals subject to the lookup table in the sine wave generator 123; therefore, the invention can generate sine waves and detect sensing signals by means of the lookup table, simplifying the loop operation of the mutual capacitance touch sensing device 1 and increasing its operational efficiency.

2. The sine wave generator 123 uses a clock to generate sine waves according to the lookup table therein; the integer multiple of the sine value of each phase is a predetermined voltage value of the respective phase; the integer multiple of the sine value of each measuring phase is an integer value; when the measurement unit 122 scans and obtains the generated sensing signal at the crossover point at each sensing line 112 subject to the lookup table, it can provide integer values of the multiple measuring phases of each sine wave to the processor 13 for integer arithmetic, thus, when comparing this technique of integer arithmetic with the conventional technique of floating point arithmetic, the invention simplifies the sensing signal sensing process and, the processor 13 used in the mutual capacitance touch sensing device 1 in accordance with the present invention can be selected from a relatively lower level, saving the cost.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A sine wave measuring method used in a mutual capacitance touch sensing device comprising a touch sensing panel having arranged therein a plurality of driving lines extending along a first axis in a parallel manner and a plurality of sensing lines extending along a second axis in a parallel manner and crossed over said driving lines to form a plurality of crossover points, a driver and sensor module, said driver and sensor module comprising a selective circuit electrically connected with said driving lines, a measurement unit electrically connected with said sensing lines and a sine wave generator electrically connected with said selective circuit and said measurement unit and having a lookup table loaded therein, and a processor electrically connected with said measurement unit, the sine wave measuring method comprising the steps of:

(A01) said sine wave generator using a clock to generate multiple sine waves according to said lookup table, and then transmitting generated sine waves to said selective circuit;

(A02) said selective circuit transmitting said sine waves to said driving lines of said touch sensing panel in a proper order;

(A03) each said sine wave at each said driving line being capacitive-coupled to the respective said sensing line through the respective said crossover point to produce a respective sensing signal at the respective said crossover point; and (A04) said measurement unit scanning the generated sensing signal at each said sensing line subject to said lookup table in said sine wave generator, so as to obtain the generated sensing signals at the respective said crossover points, wherein said lookup table being loaded in said sine wave generator is established using a sine wave differential technique to differentiate each sine wave into a plurality of segments each corresponding to one respective phase where the integer multiple of the sine value of each said phase is a predetermined voltage value of the respective phase, and multiple particular phases are marked as predetermined measuring phases, and wherein said predetermined measuring phases are 30°, 90°, 150°, 210°, 270° and 330°.

2. The sine wave measuring method as claimed in claim 1, wherein when said selective circuit transmits multiple sine waves to said driving lines of said touch sensing panel, the sinusoidal quantity receivable by said driving lines is relatively increased to enhance signal intensity subject to the increase in distance between each said driving line and said measurement unit.

3. The sine wave measuring method as claimed in claim 1, wherein said driver and sensor module of said mutual capacitance touch sensing device comprises a plurality of channels electrically connected with said sensing lines, and a plurality of current-to-voltage converters respectively electrically connecting said channels to said processor.

4. The sine wave measuring method as claimed in claim 1, wherein said driver and sensor module of said mutual capacitance touch sensing device comprises a plurality of channels electrically connected with said sensing lines, and a plurality of analog-to-digital converters respectively electrically connecting said channels to said processor.

5. The sine wave measuring method as claimed in claim 1, wherein said driver and sensor module of said mutual capacitance touch sensing device comprises a plurality of channels electrically connected with said sensing lines, and a plurality of subtraction circuits electrically connecting said channels to said processor, each said subtraction circuit being coupled between a predetermined multiple adjacent channels of said driver and sensor module.

6. A mutual capacitance touch sensing device comprising:
a touch sensing panel comprising a plurality of driving lines extending from a first axis in a parallel manner, and a plurality of sensing lines extending from a second axis in a parallel manner, said sensing lines crossed over said driving lines to form a plurality of crossover points;
a driver and sensor module, said driver and sensor module comprising a selective circuit electrically connected with said driving lines, a measurement unit electrically connected with said sensing lines, a sine wave generator electrically connected with said selective circuit and adapted for generating sine waves according to a lookup table being loaded therein and a measurement unit electrically connected with said sine wave generator and adapted for scanning each sensing signal generated at the crossover point at each said sensing line subject to said lookup table in said sine wave generator; and
a processor electrically connected with said measurement unit,
wherein said lookup table being loaded in said sine wave generator is established using a sine wave differential technique to differentiate each sine wave into a plurality of segments each corresponding to one respective phase where the integer multiple of a sine value of each said phase is a predetermined voltage value of the respective phase, and multiple particular phases are marked as predetermined measuring phases, and
wherein said predetermined measuring phases are 30°, 90°, 150°, 210°, 270° and 330°.

7. The mutual capacitance touch sensing device as claimed in claim 6, wherein when said selective circuit transmits multiple sine waves to said driving lines of said touch sensing panel, the sinusoidal quantity receivable by said driving lines is relatively increased to enhance signal intensity subject to the increase in distance between each said driving line and said measurement unit.

8. The mutual capacitance touch sensing device as claimed in claim 6, wherein said driver and sensor module of said mutual capacitance touch sensing device comprises a plurality of channels electrically connected with said sensing lines, and a plurality of current-to-voltage converters respectively electrically connecting said channels to said processor.

9. The mutual capacitance touch sensing device as claimed in claim 6, wherein said driver and sensor module of said mutual capacitance touch sensing device comprises a plurality of channels electrically connected with said sensing lines, and a plurality of analog-to-digital converters respectively electrically connecting said channels to said processor.

10. The mutual capacitance touch sensing device as claimed in claim 6, wherein said driver and sensor module of said mutual capacitance touch sensing device comprises a plurality of channels electrically connected with said sensing lines, and a plurality of subtraction circuits electrically connecting said channels to said processor, each said subtraction circuit being coupled between a predetermined multiple adjacent channels of said driver and sensor module.

* * * * *